June 12, 1951    F. J. STRIANO    2,556,827
FISHING ROD WRAPPING MACHINE
Filed June 20, 1949

INVENTOR.
FRANK J. STRIANO,
BY Wilfred Lawson
ATTORNEY

Patented June 12, 1951

2,556,827

UNITED STATES PATENT OFFICE 2,556,827

FISHING ROD WRAPPING MACHINE

Frank J. Striano, Los Angeles, Calif.

Application June 20, 1949, Serial No. 100,205

5 Claims. (Cl. 242—7)

This invention appertains to improvements in wrapping machines generally, and more particularly to a type for applying wrapped bindings to fishing rods for decorative purposes, or the reinforcement of the joints of fishing rods.

An object of the invention is to provide a machine for the stated purpose, which is of an extremely simplified, practical, and inexpensive construction, as compared with known makes of such machines, and capable of performing its functions with equal efficiency in the hands of the inexperienced operator as in the hands of the expert; the binding cord, or thread, being uniformly wound in place, under an applied tension, with the convolutions in a desired close relation, or contact, while the rod is rotated by any available means, power or manual.

With this and other objects and advantages of equal importance in view, the invention resides in the certain new and useful combination, construction, and arrangement of parts, as will be hereinafter more fully described, set forth in the appended claims, and illustrated in the accompanying drawings, wherein:

Figure 1:
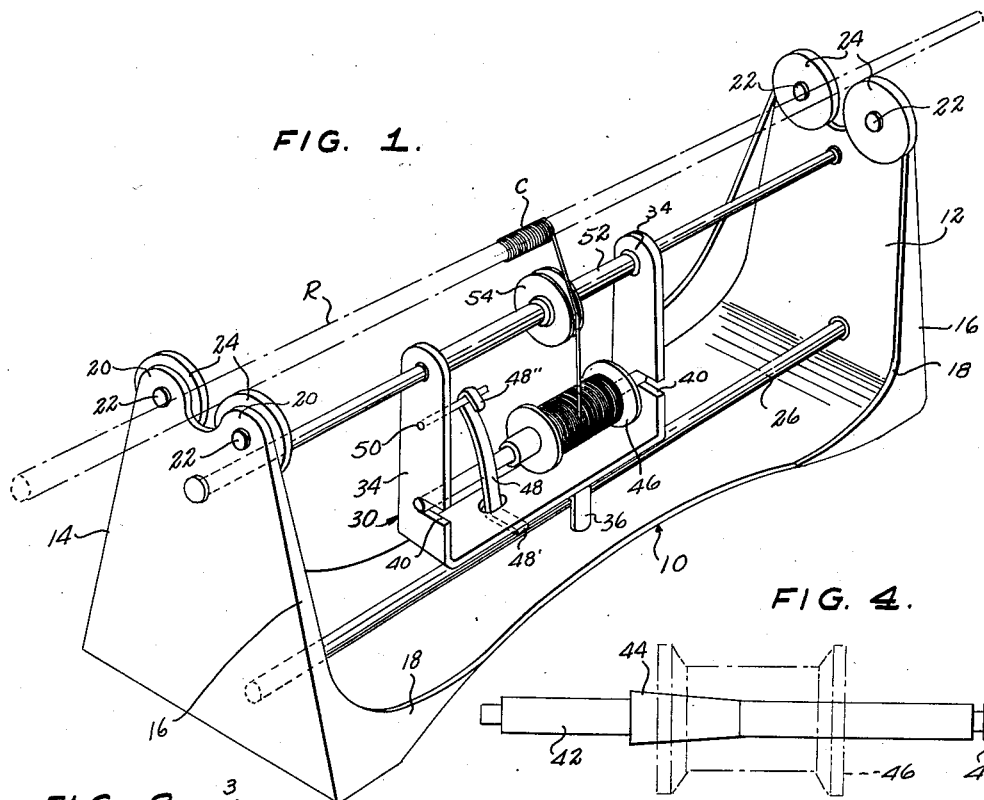
Figure 1 is a perspective view of a preferred embodiment of machine.
Figure 4:
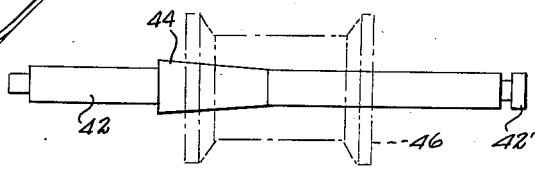
Figure 4 is a side view of the spindle mounting for the bobbin.
Figure 2:
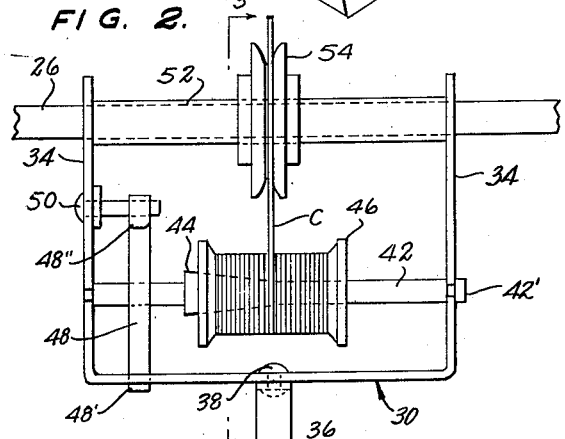
Figure 2 is a front elevation of the movable carriage and showing the cooperative relation between the binding supply bobbin, the binding guide, and the bobbin tensioning means.
Figure 3:
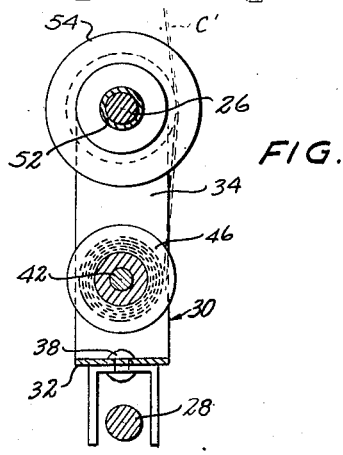
Figure 3 is a vertical transverse sectional view, taken through the line 3—3 on Figure 2.

Referring to the drawings, 10 indicates generally the main frame of the machine, which is preferably made from a relatively heavy gauge sheet metal and U-shape in side elevation, the same being comprised in a flat bottom wall 12 and upstanding end walls 14, the latter being made rigid by flanges 16, inturned from the side edges thereof, and which merge into similar flanges 18, upturned from the adjacent end of the side edges of the bottom wall 12. The top edge of each of the end walls 14 is formed to provide a pair of spaced upstanding ears 20, which are centrally apertured to receive stud mountings 22 for rollers 24, the latter being preferably made of rubber, or a like material, and provided with metal hubs (not shown) to receive the stud mountings. During each winding operation, the fishing rod R is supported lengthwise in the upper throats of the rollers 24 for relative rotation with the latter.

Extending lengthwise of the frame 10, and in the plane of its longitudinal center, a relatively short distance below the rollers 24, is a rod 26, which has its ends fixedly secured in the end walls 14 and from which a carriage, generally indicated at 30, is slidably suspended. Spaced below the rod 26, in line with the same and parallel thereto, is a second rod 28, which also has its ends fixedly secured in the side walls 14, and which functions as a guide for the carriage 30, in its sliding movements along the upper rod 26.

The carriage 30 is also made U-shape in side elevation, and preferably from sheet metal of a like gauge to that of the frame 10, the same being comprised in a bottom wall 32 and upstanding end walls 34, which are of an appreciably lesser width than the corresponding walls of the frame 10. The upper ends of the walls 34 are apertured to receive the rod 26, and an inverted, substantially U-shaped, guide element 36 is secured centrally on the lower side of the bottom wall 32 by a suitable means, such as a rivet 38, and seated over the lower rod 28. The front side edges of the end walls 34 are inwardly slotted, as at 40, to removably receive the reduced ends of a spindle 42, one of which ends is headed, as at 42', to engage the outer side of the adjacent end wall 34 to prevent endwise movement of the spindle. The spindle 42 is formed with a somewhat enlarged tapered portion 44, intermediate its ends, for the frictional seating of a binding supply bobbin 46 thereon, when the spindle is removed from the slots 40 for the purpose.

Mounted on the bottom wall 32, of the carriage 30, is a tensioning element 48, which has bearing on the spindle 42, at one side of the enlargement 44, to prevent free rotation of the same and the bobbin 46, during a winding operation. This element 48 is preferably in the form of a length of flat spring steel, and has its lower end passed downwardly through a slot in the bottom wall 32 and angularly bent, as at 48', in the forward direction, to contactingly engage with the lower side of the latter, and its upper end bent into the form of a hook 48" and engaged on a pin 50 projecting inwardly from its point of securement in the adjacent end wall 34, the pin being spaced above the spindle 42. The slot in the bottom wall 32, in which the lower end of the spring 48 is engaged, is positioned slightly forward from the front side of the spindle 42, in order that the spring will be bowed in a rearward direction from its point of bearing on the latter, when the hook 49'', at its upper end, is engaged on the pin 50, as is best shown in Figure 1.

Extending horizontally between the upper ends of the end walls 34, of the carriage 30, and rotatable on the rod 26, is a sleeve 52, constituting the hub of a guide roller 54, which has its periphery grooves for the guidance of the binding cord, or thread, C, during a winding operation; the groove preferably being V-shaped to allow for the changing angle of the run of the binding as it unwinds from the bobbin 46.

Figure 5:
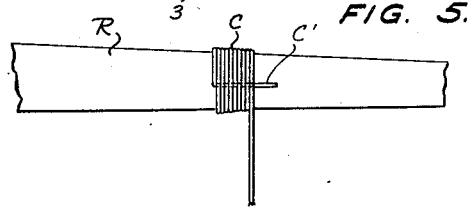
Figure 5 is a side view of a portion of a fishing rod, showing the manner in which the binding is wound thereon.

In the operation of the device, as thus constructed and arranged, the rod R is positioned on the roll pairs 24 in the manner as shown in Figure 1, and is to be rotated either by hand, or by any suitable power means, e. g., by having its larger end secured in a power driven chuck (not shown), such as the chuck of a power driven lathe. At the start of each winding operation, the free end of the binding cord or thread, indicated at C' in Figure 5, is held against and longitudinally of the side of the rod and in a manner that successive convolutions will overlie the same; the carriage 30 being positioned on the suspension rod 26 so that the guide roller 54 is directly beneath the starting point for the winding of the first convolution, and is thereafter moved with a step by step sliding motion along the rod correspondingly for each convolution until the desired length of the winding is reached, following which, the operator will sever the binding C and affix the cut end to the rod R with a drop of a suitable adhesive, or cement, thus completing the operation.

Having thus fully described my invention in its preferred embodiment, it will be readily apparent that I have provided a comparatively simple winding mechanism which is capable of being cheaply manufactured and easily operated efficiently by the inexperienced equally as well as by the experienced of operators; and it is to be understood that the words which I have used are words of description rather than of limitation, and that changes in form and details of construction may be made within the purview of the appended claims without departing from the true scope of my invention in its broader aspects.

What I claim is:

1. A wrapping machine for applying binding windings to fishing rods and the like, comprising a frame, a pair of rollers journalled in closely spaced peripheral relation at the upper side of each end of said frame to support the rod on the upper adjacent peripheries thereof, said frame made substantially U-shaped from a length of sheet metal to provide a flat bottom wall and upstanding end walls, reinforcing flanges inturned from the side edges of said end walls, like flanges upturned from the side edges of said bottom wall adjacent its opposite ends and merging into said reinforcing flanges, a carriage supported for horizontal sliding movements below and parallel to the rod, a spindle mounted for rotation horizontally on said carriage, a bobbin holding a supply of the binding mounted on said spindle, a guide element for the binding mounted on said carriage above said bobbin, and means on said carriage to tension said spindle against free rotation during each winding operation.

2. The machine as defined in claim 1, with the said rollers mounted adjacent the top edges of said end walls, and a tie rod is secured at its ends in said end walls below and in line with the spaces between the pairs of rollers for the suspension of said carriage therefrom.

3. A wrapping machine for applying binding windings to fishing rods and the like, comprising a frame formed to provide a flat bottom wall and upstanding end walls, a pair of rollers journalled in closely spaced peripheral relation on the upper edges of said end walls to support a rod on the upper adjacent peripheries thereof, a tie rod having its ends fixedly secured in said end walls below said rollers and in line with the spaces therebetween, a carriage slidably supported on said tie rod, a second tie rod also having its ends fixedly secured in said end walls below and in line with the first named tie rod, a guide element mounted on the lower side of said carriage and engaged over said second tie rod, a spindle removably mounted for rotation horizontally on said carriage, a bobbin holding a supply of the binding mounted on said spindle, a guide element for the binding mounted on said carriage above said bobbin, and means on said carriage to tension said spindle against free rotation during each winding operation.

4. The machine as defined in claim 3, with said carriage comprised in a U-shaped frame having the upper ends of its side portions apertured and engaged on the first named tie rod, and with the last named guide element being a grooved roller mounted on a tubular hub engaged on the first named tie rod between the upper end of the side portions of said frame, the groove in said roller being V-shaped to allow for the changing angle of the run of the binding as it unwinds from the bobbin.

5. The machine as defined in claim 3, with said carriage comprised in a U-shaped frame having the upper ends of its side portions apertured and engaged on the first named tie rod, and said tension means having the form of a length of flat spring steel rising from the lower end portion of the frame and having its lower end secured thereto and its upper end bent to form a hook, a pin projecting inwardly from one of said side portions above and in line with said spindle and engaged by said hook so that the spring is bowed into contact with the spindle.

FRANK J. STRIANO.

REFERENCES CITED

The following references are of record in the file of this patent:

UNITED STATES PATENTS

| Number | Name | Date |
|---|---|---|
| 665,015 | Kennedy | Jan. 1, 1901 |
| 690,353 | Brewster | Dec. 31, 1901 |
| 861,283 | Hjorth | July 30, 1907 |
| 1,592,592 | Anderson | July 13, 1926 |
| 2,244,804 | Robinson | June 10, 1941 |
| 2,460,478 | Warner | Feb. 1, 1949 |
| 2,486,739 | Foster | Nov. 1, 1949 |